Figure 1:
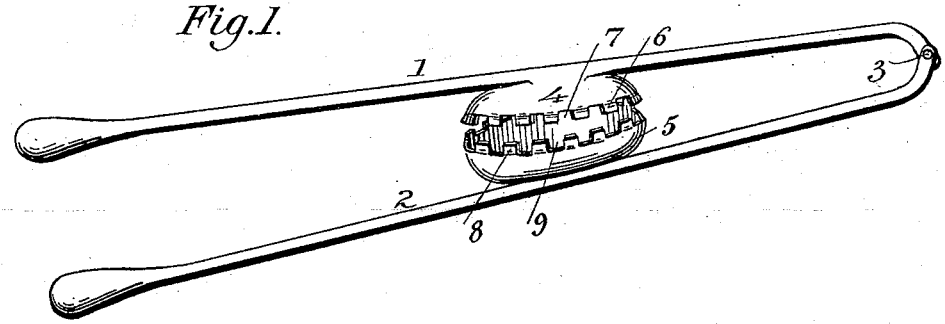

(No Model.)

H. E. SWARTZ.
SOAP PRESS.

No. 604,436.  Patented May 24, 1898.

Witnesses:
J. S. Borren
J. A. Willson

Inventor:
Harry E. Swartz,
By H. B. Willson
Attorney

UNITED STATES PATENT OFFICE.

HARRY E. SWARTZ, OF READING, PENNSYLVANIA.

SOAP-PRESS.

SPECIFICATION forming part of Letters Patent No. 604,436, dated May 24, 1898.

Application filed June 24, 1897. Serial No. 642,080. (No model.)

*To all whom it may concern:*

Be it known that I, HARRY E. SWARTZ, a citizen of the United States, residing at Reading, in the county of Berks and State of Pennsylvania, have invented certain new and useful Improvements in Soap Molds or Presses; and I do declare the following to be a full, clear, and exact description of the invention, such as will enable others skilled in the art to which it appertains to make and use the same.

My invention relates to an improved domestic soap mold or press; and the object is to provide a simple, convenient, and effective device of this class for conveniently pressing scraps of soap into a single cake.

To this end the novelty consists in the construction, combination, and arrangement of the same, as will be hereinafter more fully described, and particularly pointed out in the claims.

In the accompanying drawings the same reference characters indicate the same parts of the invention.

Figure 2:
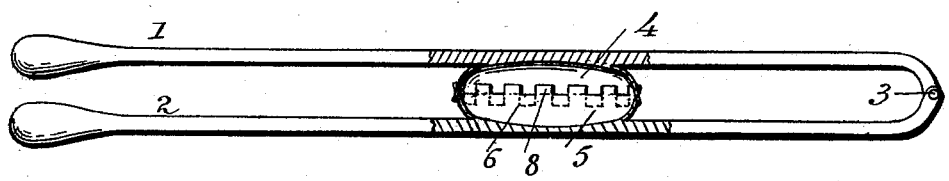
Figure 3:
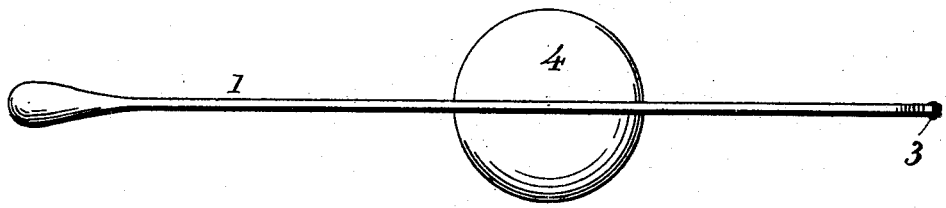

Figure 1 is a perspective view of a soap mold or press embodying my invention. Fig. 2 is a longitudinal section of the same, and Fig. 3 is a top plan view.

1 and 2 represent lever-handles fulcrumed at their outer curved ends by a rivet or bolt 3.

4 and 5 represent cup-shaped disks fixed, respectively, to the handles 1 and 2 and having their concave faces opposite to each other. The cylindrical edge of the disk 4 is provided with a continuous series of rectangular guide-ears 6, separated by an intervening series of correspondingly-shaped recesses 7. The disk 5 is likewise formed with a corresponding series of guide-ears 8, separated by an intervening series of recesses 9 so arranged that when the handles are brought together the guide-ears 6 on the disk 4 will enter the recesses 9 in the disk 5, and, vice versa, the guide-ears 8 on the disk 5 will enter the recesses 7 on the disk 4.

The "odds and ends" or scraps of soap which are too small to be conveniently used separately are collected together and placed in the mold or press and the handles brought together. The intermeshing of the teeth acts as guides and preserves the alinement of the disks, and as the disks approach nearer together the teeth on one disk pass or extend beyond their corresponding recesses on the other disk, as shown in Fig. 2, thereby closing up the recesses, while permitting the disks to be brought still closer together, the projecting ends of the teeth preventing the escape of the material through the recesses. The resulting cake is of a true double-convex form.

Having thus fully described my invention, what I claim as new and useful, and desire to secure by Letters Patent of the United States, is—

1. A domestic soap mold or press, comprising the pivoted lever-handles 1 and 2, the separable disks 4 and 5 fixed thereto, and provided with intermeshing edges, substantially as shown and described.

2. The domestic soap mold or press, comprising the pivoted handles 1 and 2, the cup-shaped disk 4 fixed to the handle 1, and provided with a series of guide-ears 6 6, and an intervening series of recesses 7 7, and the oppositely-disposed cup-shaped disk 5 formed with a series of guide-ears 8 and intervening recesses 9 alternating with the corresponding guide-ears and recesses on the disk 4, substantially as shown and described.

In testimony whereof I hereunto affix my signature in presence of two witnesses.

HARRY E. SWARTZ.

Witnesses:
JOSEPH A. ALLGAIER,
ANNA M. MAXTON.